United States Patent [19]
Demido

[11] 4,150,855
[45] Apr. 24, 1979

[54] VEHICLE LOAD RESPONSIVE BRAKE ACTUATING PRESSURE PROPORTIONER AND ACTUATING LINKAGE THEREFOR

[75] Inventor: Michael Demido, Troy, Ohio
[73] Assignee: General Motors Corporation, Detroit, Mich.
[21] Appl. No.: 846,371
[22] Filed: Oct. 28, 1977
[51] Int. Cl.$^2$ .............................................. B60T 8/22
[52] U.S. Cl. ................... 303/22 R; 303/6 C
[58] Field of Search ............. 303/6 C, 22 R, 22 A, 303/23 R; 188/195

[56] References Cited

U.S. PATENT DOCUMENTS

| | | | |
|---|---|---|---|
| 2,098,129 | 11/1937 | Bell | 303/22 R |
| 2,374,002 | 4/1943 | Down et al. | 303/22 R X |
| 2,824,769 | 2/1958 | Thomas | 303/22 R |
| 3,874,746 | 4/1975 | Pollinger et al. | 303/22 R |
| 3,973,804 | 8/1976 | Engfer et al. | 303/22 R X |
| 4,040,674 | 8/1977 | Marcillaud | 303/22 R |

Primary Examiner—Duane A. Reger
Attorney, Agent, or Firm—D. D. McGraw

[57] ABSTRACT

A vehicle suspension system includes a vehicle sprung mass and a suspension control arm connected to and being a part of the unsprung mass. A suspension spring seats on an upper spring seat on the vehicle frame and on a lower spring seat mounted on the control arm. A brake actuating pressure proportioner is mounted on the control arm and has a spring loaded proportioning piston therein for proportioning the brake pressure through the proportioner. A plunger loads the proportioning spring to establish the brake pressure point at which proportioning action begins. A cap fits over the outer end of the plunger and is movable with the plunger. The lower spring seat engages levers which are fulcrumed on a portion of the control arm at their outer ends and on a flange of the cap at their inner ends, the points of engagement of the lower spring seat being intermediate the lever ends, so that a proportionate amount of the vehicle load exerted through the suspension spring is transmitted to the proportioner plunger and the remainder of the load is transmitted directly to the control arm. The spring seat therefore loads the plunger and the proportioning spring and the proportioning piston in accordance with the load on the suspension spring to modify the proportioning action of the proportioning piston in accordance with changes in vehicle load as represented by the load on the suspension spring.

2 Claims, 2 Drawing Figures

VEHICLE LOAD RESPONSIVE BRAKE ACTUATING PRESSURE PROPORTIONER AND ACTUATING LINKAGE THEREFOR

The invention relates to a proportioner and actuating linkage for the proportioner, the proportioner being responsive to vehicle load to proportion brake actuating pressure therethrough. The vehicle suspension arrangement includes a suspension spring and a seat on which one end of the suspension spring is seated. The suspension spring is loaded in accordance with vehicle load. The proportioner has a variable proportioning piston and valve in a housing. The piston and valve are adapted to proportion brake actuating pressure through the proportioner. A proportioning spring is loaded in compression to resist proportioning movement of the proportioning piston in accordance with vehicle load to modify the proportioning action of the piston accordingly. A plunger engages the proportioning spring and is movable in accordance with vehicle load to load the proportioning spring. The spring seat operatively engages the plunger to load the plunger and therefore to load the proportioning spring and the proportioning piston in accordance with the load on the suspension spring so as to modify the proportioning action of the proportioning piston in accordance with changes in vehicle load as represented by the load on the suspension spring.

More particularly, the proportioner is mounted on a suspension control arm with the suspension spring extending between a portion of the vehicle body such as the vehicle frame, and the control arm. A mechansim is provided to transmit proportionate amounts of vehicle load on the suspension spring from the spring seat to the plunger and to the control arm to load the plunger in the manner above described. The transmitting means includes a cap member engaging and movable with the plunger, and levers having first ends fulcrumed on the control arm and second ends fulcrumed on the cap member. The spring seat has pivot points thereon engaging the levers in force transmitting relation at fulcrum points intermediate the lever ends so that the relationship of the distances from the lever ends to these fulcrum points establishes the proportion of vehicle load transmitted from the spring seat to the plunger and to the control arm.

IN THE DRAWING

Figure 1:
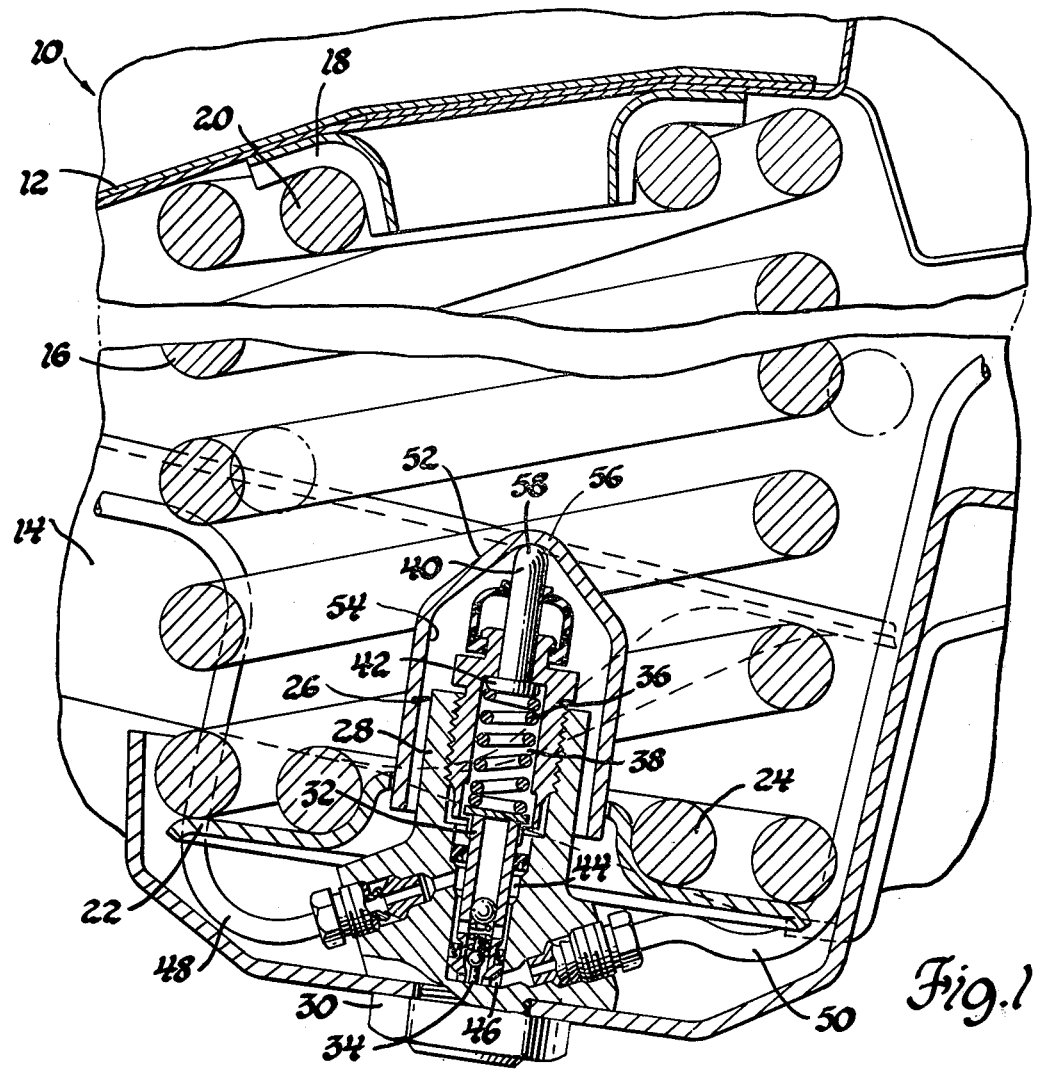
FIG. 1 is a fragmentary view of a vehicle suspension system embodying the invention and having part broken away and in section.

The vehicle 10 includes a vehicle body or frame section 12 which is a part of the vehicle sprung mass. It also includes a suspension control arm 14 which is a part of the vehicle unsprung mass. A suspension spring 16 extends between the vehicle frame 12 and the control arm 14. A spring upper seat 18 is provided to receive the spring upper end 20 and locate it on the vehicle frame. A spring lower seat 22 receives the spring lower end 24.

The brake actuating pressure proportioner 26 includes a housing 28 which is suitably secured as at 30 to a part of the control arm 14. Housing 28 has a proportioning piston 32 reciprocably movable therein to proportion brake actuating pressure therethrough. The proportioning valve 34 is positioned to cooperate with the proportioning piston 32 to achieve this result in a manner well known in the art. E.g., the proportioner may be constructed in a manner generally similar to the proportioner disclosed in U.S. Pat. No. 3,733,106, entitled "Combination Valve Assembly with Proportioner Over-ride" issued May 15, 1973. The proportioner spring 36 is contained in a spring chamber 38 formed in housing 28 and is loaded in compression to exert force on proportioning piston 32. A plunger 40 extends out of housing 28 and has a spring seat 42 formed thereon and contained in chamber 38. One end of proportioning spring 36 in seated on spring seat 42. The other end of spring 36 is seated on the upper end of proportioning piston 32.

Housing 28 has an inlet chamber 44 formed about the proportioning piston 32 and an outlet chamber 46 at the outer end of proportioning piston 32. An inlet brake actuating pressure line 48 is connected to the proportioner so as to introduce brake actuating pressure fluid into inlet chamber 44. The brake actuating fluid flows past proportioning valve 34 and into outlet chamber 46. It is then transmitted to the vehicle brakes to actuate them through the output brake pressure line 50.

Figure 2:
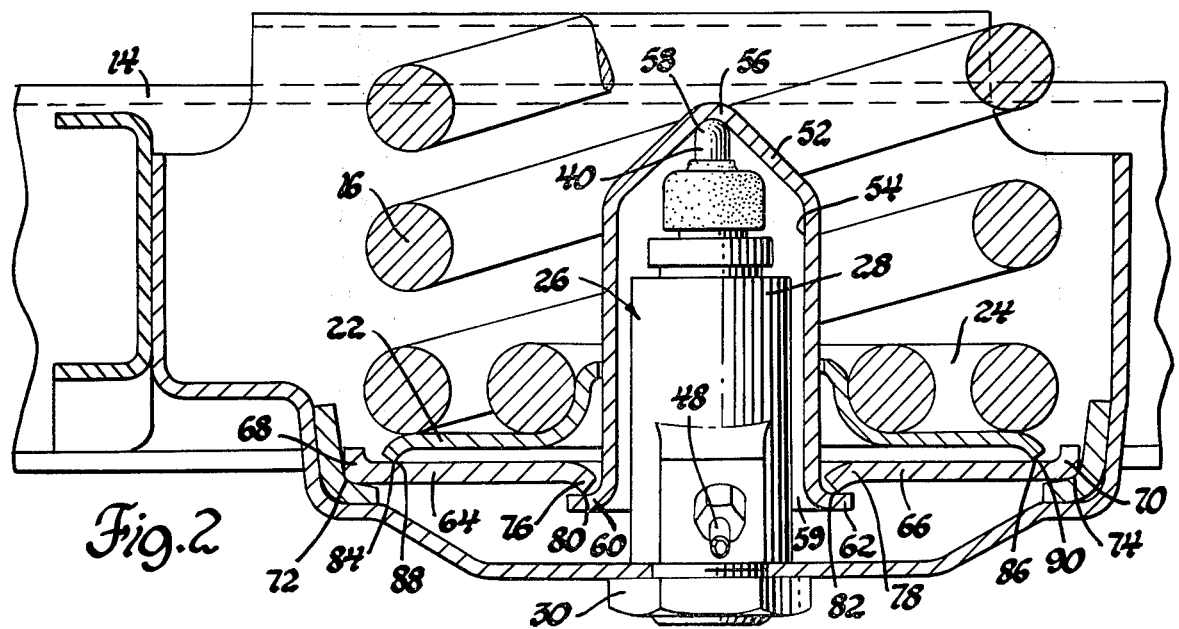
FIG. 2 is a view similar to FIG. 1 and illustrates in greater detail the transmitting means which proportions vehicle load to the proportioner plunger and to the control arm of the suspension system.

Cap member 52 is positioned over the proportioner 26 so that much of the body of the proportioner housing 28, and the plunger 40, are contained within the inner wall 54 of the cap 52. The inner apex 56 of the cap acts as a socket engaging the end 58 of plunger 40, and cap member 52 is axially movable to move plunger 40 against proportioning spring 36. The open end 59 of cap member 52 is provided with flanges, two such flanges 60 and 62 being illustrated in FIG. 2. A plurality of levers is also provided, and two such levers 64 and 66 are illustrated in FIG. 2. In some installations, only two levers may be desired. In other installations, additional levers may be preferable. Levers 64 and 66 have outer ends 68 and 70 which are respectively fulcrumed on a portion of a control arm 14 at fulcrums 72 and 74. The other lever ends 76 and 78 are in engagement with flanges 60 and 62 at fulcrums 80 and 82, respectively. The lower suspension spring seat 22 is illustrated as being annularly formed so that it fits over cap member 52 and is movable axially of the proportioner 26 relative to that cap. The spring seat is provided with pivot points 84 and 86 which respectively engage levers 64 and 66 at fulcrum points 88 and 90 located intermediate the respective lever ends of the levers 64 and 66. Thus, with regard to lever 64, e.g., the distance between fulcrum point 88 and fulcrum 72 relative to the distance between fulcrum point 88 and fulcrum 80 establishes the proportionate amount of vehicle load transmitted from the suspension spring 16 through seat 22 directly to the control arm 14 and to the plunger 40 of the proportioner 26. The same proportion is established in a similar manner with regard to lever 66.

When a particular vehicle load is set, a part of it is transmitted to the suspension spring 16. Spring 16 transmits a portion of that load through spring seat 22 and levers 64 and 66 directly to the control arm 14. It transmits another portion of that load through the spring seat and the levers to cap member 52 and then to plunger 40 to load the proportioning spring 36 in accordance with the proportionate amount of load so transmitted. If the vehicle load increases, the proportionate amounts of the increased load are similarly transmitted directly to the control arm and to the proportioner 26. By increasing the load on proportioning spring 36, a higher brake actuating pressure is required before proportioning piston 32 beings its proportioning action. Similarly, if the vehicle load is decreased, a proportionate amount of the decreased load is transmitted to plunger 40 and proportioning spring 36, and the proportioning piston 32 will then begin its proportioning action at a lower brake actuating pressure. Therefore, the proportioning action of the proportioning piston is controlled in accordance with the load on the suspension spring and modified in accordance with changes in vehicle load as represented by the load on the suspension spring. The assembly may be readily so arranged that the proportionate amount of load transmitted to the proportioning spring 36 through plunger 40, while remaining proportionate to total vehicle load, is a relatively small amount of the part of the total vehicle load transmitted through the suspension spring 16. This permits the use of a relatively small proportioning spring 36 and proportioner 26.

What is claimed is:

1. A vehicle load responsive brake actuating pressure proportioner and actuating linkage therefor comprising:
   a suspension arrangement for a vehicle including a suspension spring and a seat on which one end of said suspension spring is seated, said suspension spring being loaded in accordance with vehicle load;
   said proportioner having a housing and a variable proportioning piston in said housing adapted to proportion brake actuating pressure therethrough, a proportioning spring loaded in compression to resist proportioning movement of said piston in accordance with vehicle load to modify the proportioning action of said piston accordingly, and a plunger engaging said proportioning spring and movable to load said proportioning spring in accordance with vehicle load;
   and a lever mechanism acting operatively between said spring seat and said plunger to transmit only a proportional part of the vehicle load from said spring seat to said plunger;
   said spring seat operatively engaging said plunger through said lever mechanism to load said plunger and therefore said proportioning spring and said proportioning piston in accordance with the load on said suspension spring to modify the proportioning action of said proportioning piston in accordance with changes in vehicle load as represented by the load on said suspension spring.

2. A vehicle load responsive brake actuating pressure proportioner and actuating linkage therefor comprising:
   a suspension arrangement for a vehicle including a suspension control arm and a suspension spring and a seat mounted on said control arm and on which one end of said suspension spring is seated, said suspension spring being loaded in accordance with vehicle load;
   said proportioner having a housing secured to said control arm and a variable proportioning piston movable in said housing and adapted to proportion brake actuating pressure therethrough, a proportioning spring loaded in compression to resist proportioning movement of said piston in accordance with vehicle load to modify the proportioning action of said piston accordingly, a plunger engaging said proportioning piston and movable in said housing to load said proportioning spring in accordance with vehicle load;
   and means transmitting proportionate amounts of vehicle load on said suspension spring from said spring seat to said plunger and to said control arm to load said plunger and therefore said proportioner spring and said proportioning piston in accordance with the load on said suspension spring to modify the proportioning action of said proportioning piston in accordance with changes in vehicle load as represented by the load on said suspension spring, said transmitting means including a member engaging and movable with said plunger, and at least two levers having first ends fulcrumed on said control arm and second ends fulcrumed on said member;
   said spring seat having pivot points thereon engaging said levers in force transmitting relation at fulcrum points intermediate said lever first and second ends so that the relationship of the distance from said lever ends to said fulcrum points establishes the proportion of vehicle load transmitted from said spring seat to said plunger and to said control arm.

* * * * *